United States Patent
Sung

(10) Patent No.: US 8,676,698 B2
(45) Date of Patent: Mar. 18, 2014

(54) SYSTEM AND METHOD FOR OPERATING A GIFT CERTIFICATE ON THE BASIS OF CREDIT CARD TRANSACTIONS

(76) Inventor: Mi-Sun Sung, Seoul (KR)

( * ) Notice: Subject to any disclaimer, the term of this patent is extended or adjusted under 35 U.S.C. 154(b) by 1746 days.

(21) Appl. No.: 10/508,942
(22) PCT Filed: Mar. 24, 2003
(86) PCT No.: PCT/KR03/00566
§ 371 (c)(1),
(2), (4) Date: Oct. 1, 2004

(87) PCT Pub. No.: WO03/083750
PCT Pub. Date: Oct. 9, 2003

(65) Prior Publication Data
US 2005/0177493 A1    Aug. 11, 2005

(30) Foreign Application Priority Data

Apr. 1, 2002 (KR) .......... 10-2002-0017709
Nov. 1, 2002 (KR) .......... 10-2002-0067540
Mar. 12, 2003 (KR) .......... 10-2003-0015291

(51) Int. Cl.
*G06Q 40/00* (2012.01)
*G06Q 40/02* (2012.01)
(52) U.S. Cl.
CPC .............. *G06Q 40/00* (2013.01); *G06Q 40/025* (2013.01)
USPC .............................................. 705/38; 705/35
(58) Field of Classification Search
USPC ...................................................... 705/35–45
See application file for complete search history.

(56) References Cited

U.S. PATENT DOCUMENTS 6,006,205 A * 12/1999 Loeb et al. .......... 705/34
6,032,135 A *  2/2000 Molano et al. ...... 705/41
6,038,552 A *  3/2000 Fleischl et al. ..... 705/44
6,175,823 B1 *  1/2001 Van Dusen ........ 705/26

(Continued)

FOREIGN PATENT DOCUMENTS

JP   2000-331227 A   11/2000
JP   2002-073841 A   3/2002
JP   2002-083237 A   3/2002

OTHER PUBLICATIONS

Patricia Lamiell Associated Press, Online Bill-Paying on the Menu for Early '98 Chase manhattan Will Become First U.S. Bank to Offer Service, Oct. 21, 1997, Rocky Mountain News Denver Colorado p. 12.B.*
MMS Receipt Printer Receipt Example, Sunshine Support Services Website, Apr. 25, 2002, http://web.archive.org/web/20020425174604/http://sunshinesupport.com/mms/retail_receipt.shtml.*
Manual on POS Transactions, p. 7 <F13> Gift Certificates, Dec. 8, 2000, http://help.bsmgr.com/manual600/sales/posTrans6r.htm.*
Quittner, Jeremy. Attention Kmart Shoppers—Now, Gift Certificates on Stored-Value Cards Series: 13. Aug. 18, 1997. American Banker. vol. 162, Issue 158. p. 12. http://proquest.umi.com/pqdweb?did=13499988&sid=2&Fmt=3&clientId=19649&RQT=309&VName=PQD.*
Sal Anthony's Policy on Gift Certificates. Apr. 21, 2001. http://web.archive.org/web/20010421010527/http://www.salanthonys.com/gift_certificates.htm.*

*Primary Examiner* — Stephanie M Ziegle

(57) ABSTRACT

A system and method for operating a credit card gift certificate based on credit card transactions is disclosed. According to the method for operating the credit card gift certificate, a credit card gift certificate server adds the limit of the credit card gift certificate corresponding to an amount of money printed on the credit card gift certificate to the transaction limit of a credit card of a credit card user, and the credit card user uses the amount of money of the gift certificate through the credit card transactions within the additionally configured limit of the credit card transaction. An amount obtained by subtracting the limit of the gift certificate from an amount paid by the credit card is determined as a payment amount to be paid by the user on a credit card bill that is sent to the user.

15 Claims, 11 Drawing Sheets

(56) References Cited

U.S. PATENT DOCUMENTS

| | | | |
|---|---|---|---|
| 6,182,895 B1 * | 2/2001 | Albrecht | 235/380 |
| 6,193,155 B1 * | 2/2001 | Walker et al. | 235/381 |
| 6,330,544 B1 * | 12/2001 | Walker et al. | 235/380 |
| 6,494,367 B1 * | 12/2002 | Zacharias | 235/382 |
| 7,039,601 B2 * | 5/2006 | Gary | 705/14 |
| 7,130,817 B2 * | 10/2006 | Karas et al. | 705/26 |
| 7,155,411 B1 * | 12/2006 | Blinn et al. | 705/40 |
| 2002/0016769 A1 * | 2/2002 | Barbara et al. | 705/40 |
| 2002/0138363 A1 * | 9/2002 | Karas et al. | 705/26 |
| 2003/0004815 A1 * | 1/2003 | Sakai et al. | 705/26 |
| 2003/0023549 A1 * | 1/2003 | Armes et al. | 705/40 |
| 2003/0155416 A1 * | 8/2003 | Macklin et al. | 235/380 |
| 2003/0195840 A1 * | 10/2003 | Xu | 705/38 |

\* cited by examiner

FIG.5

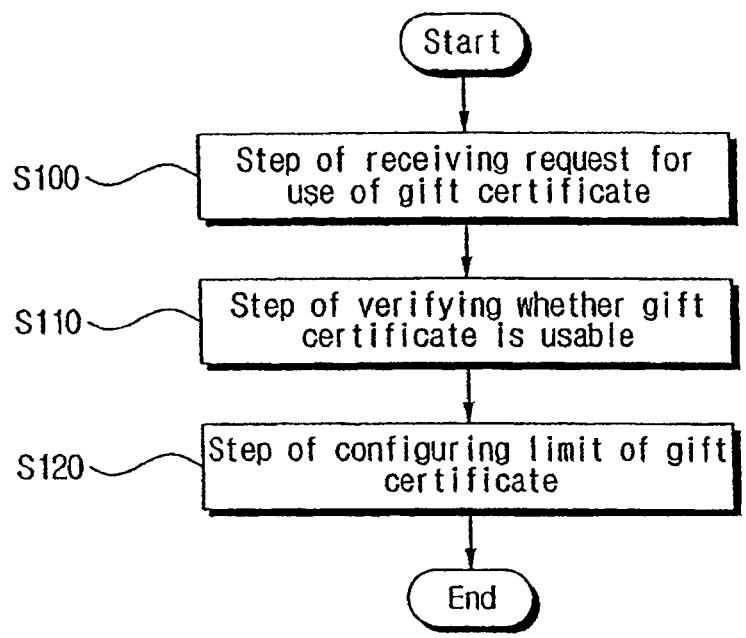

- S100 — Step of receiving request for use of gift certificate
- S110 — Step of verifying whether gift certificate is usable
- S120 — Step of configuring limit of gift certificate

FIG.6A

<Billing particulars of amount of money paid by credit card>

| Classification | Used amount | Remarks |
|---|---|---|
| One payment | KRW780,000 | |
| Installment | KRW180,000 | |
| Cash service | KRW700,000 | |
| Amount used oversea | KRW0 | |
| Annual fee | KRW10,000 | |
| Revolving payment | KRW0 | |
| Amount to be paid | KRW1,670,000 | |

FIG.6B

<Detailed use particulars of credit card>

| Credit card number | Date | Member store | Used amount | Fee (interest) | Special service |
|---|---|---|---|---|---|
| 8493 | 0502 | ○○ Restaurant | KRW230,000 | | |
| 8493 | 0507 | ××Gas station | KRW50,000 | | |
| 8493 | 0507 | △△Department store | KRW177,000 | | |
| 8493 | 0509 | ☆☆Bookstore | KRW43,000 | | |
| 8493 | 0513 | ##Theater | KRW12,000 | | |
| 8493 | 0516 | ▽▽Hospital | KRW268,000 | | |
| | | | | | |
| | | | | | |

FIG.7A

<Billing particulars of amount of money paid by credit card>

| Classification | Used amount | Remarks |
|---|---|---|
| Gift certificate | KRW500,000 | |
| One payment | KRW280,000 | |
| Installment | KRW180,000 | |
| Cash service | KRW700,000 | |
| Amount used oversea | KRW0 | |
| Annual fee | KRW10,000 | |
| Revolving payment | KRW0 | |
| Amount used | KRW1,670,000 | |
| Deduction by gift certificate | KRW500,000 | |
| Amount to be paid | KRW1,170,000 | Resultant amount to be paid |

FIG.7B

<Detailed use particulars of credit card>

| Credit card number | Date | Member store | Used amount | Fee (interest) | Results |
|---|---|---|---|---|---|
| 8493 | 0502 | ○○ Restaurant | KRW230,000 | | Deduction by gift certificate |
| 8493 | 0507 | ××Gas station | KRW50,000 | | Deduction by gift certificate |
| 8493 | 0507 | △△Department store | KRW177,000 | | Deduction by gift certificate |
| 8493 | 0509 | ☆☆ Bookstore | KRW43,000 | | Deduction by gift certificate |
| 8493 | 0513 | ## Theater | KRW12,000 | | |
| 8493 | 0516 | ▽▽Hospital | KRW268,000 | | |
| | | | | | |
| | | | | | |

FIG.8

Credit card sales slip

| CARD NUMBER | |
|---|---|
| 9 4 1 0 - 1 2 3 4 - 5 6 7 8 - 9 0 1 2 | |
| VALID DATE | 04/10 |
| DATE | 02/03/31 12:39:44 |
| Sales classification | One payment |
| Sales amount | KRW77,000 |
| Service fee | |
| Tax | |
| TOTAL | KRW77,000 |

APPROVAL NO    12345678

MERCHANT NO.

712345678        EDC Sales slip

Merchant name: OO Gas station

Business registry number: 212-34-56789

Representative name: Hong, Gil-dong 123-45 Sinsa-dong, Kangnam-ku, Seoul

| NAME | SIGNATURE |
|---|---|
|  |  |

FIG.9

Credit card sales slip

| | |
|---|---|
| CARD NUMBER 9 4 1 0 - 1 2 3 4 - 5 6 7 8 - 9 0 1 2 | |
| VALID DATE | 04/10 |
| DATE | 02/03/31 12:39:44 |
| Sales classification | Gift certificate |
| Sales amount | KRW77,000 |
| Service fee | |
| Tax | |
| TOTAL | KRW77,000 |
| APPROVAL NO    12345678 (Residual limit of gift certificate: 423,000) | |
| MERCHANT NO. | |
| 712345678    EDC Sales slip | |
| Merchant name: ○○ Gas station | |
| Business registry number: 212-34-56789 | |
| Representative name: Hong, Gil-dong | |
| 123-45 Sinsa-dong, Kangnam-ku, Seoul | |
| NAME | SIGNATURE |

SYSTEM AND METHOD FOR OPERATING A GIFT CERTIFICATE ON THE BASIS OF CREDIT CARD TRANSACTIONS

TECHNICAL FIELD

The present invention relates to a system and method for operating a credit card gift certificate based on credit card transactions, and more particularly, to a system and method capable of using an amount of money, which is printed on a gift certificate, in credit card transactions.

BACKGROUND ART

Gift certificates that general consumers have widely used are bearer securities with fixed amounts of money that can be exchanged with goods. The gift certificates have an advantage in that users of the gift certificates can purchase, at some appropriate time, a variety of goods dealt by gift certificate issuing stores to their tastes within the ranges of amounts printed on the gift certificates. Further, unrealized amounts of the gift certificates obtained through issuance of the gift certificates play a role as interest-free borrowings from the viewpoint of the gift certificate issuing stores, thereby favorably contributing to management of the gift certificate issuing stores and greatly contributing to rise of the prestige and rise of credit rating of the gift certificate issuing stores as well. Due to a variety of such advantages provided to both the gift certificate users and the gift certificate issuing stores, gift certificates are being issued and distributed by many enterprises in various fields such as department stores, bookstores and confectionery stores. As purchasable items get increased, the gift certificates are being widely given and taken as gifts among general consumers. As a result, a gift certificate market has grown rapidly in recent years.

However, in spite of such advantages, the conventional gift certificates have many problems resulting from attributes of the gift certificates.

That is, since the use of the conventional gift certificates is inevitably restricted only to gift certificate issuing stores and some affiliated stores, their distribution ranges are inevitably limited. Further, as most of the gift certificates are mainly purchased by cash, there is a problem in that purchase of the gift certificates through credit card transactions is limited in practice. In addition, there are problems in that it is impossible to identify, use particulars thereof since the gift certificates can be used by bearers, and that amounts of money used for purchasing goods using the gift certificates cannot be properties for benefit of deductions and exemptions.

In view of transactions in the gift certificates, the gift certificates have many problems. Since the transactions in the gift certificates necessarily always involve spot transactions, it is impossible to make on-line transactions and to expand transaction methods. Moreover, illegal distribution of the gift certificates through so called 'card kkang,' which is a kind of illegal card discount, has caused undesirable results opposing a tax policy of the government for intending to secure a variety of tax sources and to regulate hidden revenue.

Further, since the conventional gift certificates have predetermined limit amounts of money, if the gift certificate users intend to purchase goods beyond the predetermined limit amounts of the gift certificates, the users cannot avoid inconvenience of additionally paying exceeded amounts of money in cash or with credit cards in addition to the gift certificates, which is considered as 'duality in payment means.' Moreover, there is inconvenience of refunding the remaining amounts after purchasing goods below the limit amounts of the gift certificates, and there is also a problem in that disputes between the gift certificate issuing stores and the users frequently arise due to cash refund requests.

Recently, with a government's policy of promoting the use of credit cards, purchase of goods and services using credit cards has been prevailed among general consumers due to many advantages of credit card transactions.

Accordingly, attempts to develop new gift certificates using credit cards are continuously being made by the credit card industry in order to solve the aforementioned problems with the conventional gift certificate system and in order to promote credit card transactions. Korean Patent Application No. 2000-67106 discloses "Method of operating card gift certificate based on credit card system," wherein a gift certificate is manufactured in the form of a credit card according to order information provided by a credit card member and a third person who has received the card gift certificate manufactured in this manner freely purchases goods or services at member stores affiliated with a relevant credit card company within an issued amount of money in the card gift certificate. However, since the method of operating the card gift certificate disclosed in the above patent application requires issuance of an additional card besides the credit card, it inevitably causes resistance of rejecting the use of the card gift certificate by some member stores affiliated with the credit card company. Furthermore, the method still has a disadvantage in that use particulars of the card gift certificate are difficult to identify since any bearer thereof can use the card gift certificate, and that benefit of deductions and exemptions cannot be obtained. In addition, there is a problem in that it is still impossible to avoid the duality in payment means in which a purchasing amount exceeding a predetermined limit amount of the gift certificate should be paid by using another payment means except the card gift certificate.

DISCLOSURE OF INVENTION

Accordingly, an object of the present invention is to provide a gift certificate capable of greatly reducing limitations on purchasable items and a distribution range thereof by allowing the gift certificate to be used at any one of a plurality of member stores affiliated with a credit card company.

Another object of the present invention is to ensure free use of a gift certificate at any one of member stores affiliated with a credit card company without rejection of use of the gift certificate by some member stores.

A further object of the present invention is to increase a transaction limit of a credit card owned by a user by adding an amount of money of a gift certificate to the limit of the credit card.

A still further object of the present invention is to reduce time, costs and efforts required for issuing a new credit card by allowing an existing credit card carried by a bearer of a gift certificate to be used as it is without issuing the additional new credit card.

A still further object of the present invention is to allow use particulars of a gift certificate to be easily identified and to provide benefit of deductions and exemptions according to an amount of money of the gift certificate by causing the gift certificate to be used in the name of a credit card member rather than a bearer of the gift certificate.

A still further object of the present invention is to allow payment to be made only with a credit card without duality in payment means when a purchasing amount of money exceeds an amount of money of a gift certificate.

A still further object of the present invention is to contribute to settlement of a checkless society and efficiency of tax administration by preventing illegal distribution of a gift certificate and improving transparency of transactions.

According to the aspect of the present invention, there is provided a method for operating a credit card gift certificate based on credit card transactions comprising the steps of receiving a request for use of the gift certificate from a user of a credit card through a communication network; verifying whether the gift certificate is usable in response to the received request for use of the gift certificate; and if it is determined that the gift certificate is usable, configuring the limit of the gift certificate in the credit card of the credit card user.

In a preferred embodiment of the present invention, tentatively named "Credit Card Gift Certificate Co., Ltd." is established, and this company affiliates with a plurality of credit card companies and operates a credit card gift certificate system based on credit card transactions. A credit card gift certificate is issued by Credit Card Gift Certificate Co., Ltd. FIG. 1 shows an example of the credit card gift certificate. As shown in FIG. 1, a gift certificate issuing company, a gift certificate authentication number, an amount of money of the gift certificate a list of available credit cards, a phone number and method for request of the use of the gift certificate, and the like are printed on the surface of the credit card gift certificate. Credit Card Gift Certificate Co., Ltd. can receive orders from the credit card companies, and manufacture and issue gift certificates with unique designs for the respective credit card companies. The issued gift certificates are sold and distributed to general consumers through agents directly managed by Credit Card Gift Certificate Co., Ltd. or through the credit card companies affiliated with Credit Card Gift Certificate Co., Ltd. The gift certificate authentication number is printed on the surface of the gift certificate in a hidden form not to be directly exposed to the outside. The gift certificate authentication number may be printed in such a way that a user can scratch a portion hiding the authentication number with a coin or the like in the same manner as an instant lottery ticket so that the user can recognize the authentication number.

BRIEF DESCRIPTION OF DRAWINGS

FIG. 5 is a flowchart showing a procedure of a method for performing credit card transactions using the credit card gift certificate according to an embodiment of the present invention.

FIG. 6 is a drawing showing a general example of a credit card bill notified to a credit card user in conventional credit card transactions.

FIG. 7 is a drawing showing a credit card bill notified to credit card user in the credit card transactions in which the limit of the gift certificate is configured to the credit card according to an embodiment of the present invention.

FIG. 8 is a drawing showing a credit card sales slip in conventional credit card transactions.

FIG. 9 is a drawing showing a credit card sales slip in the credit card transactions in which the limit of the gift certificate is configured to the credit card according to an embodiment of the present invention.

Figure 1:
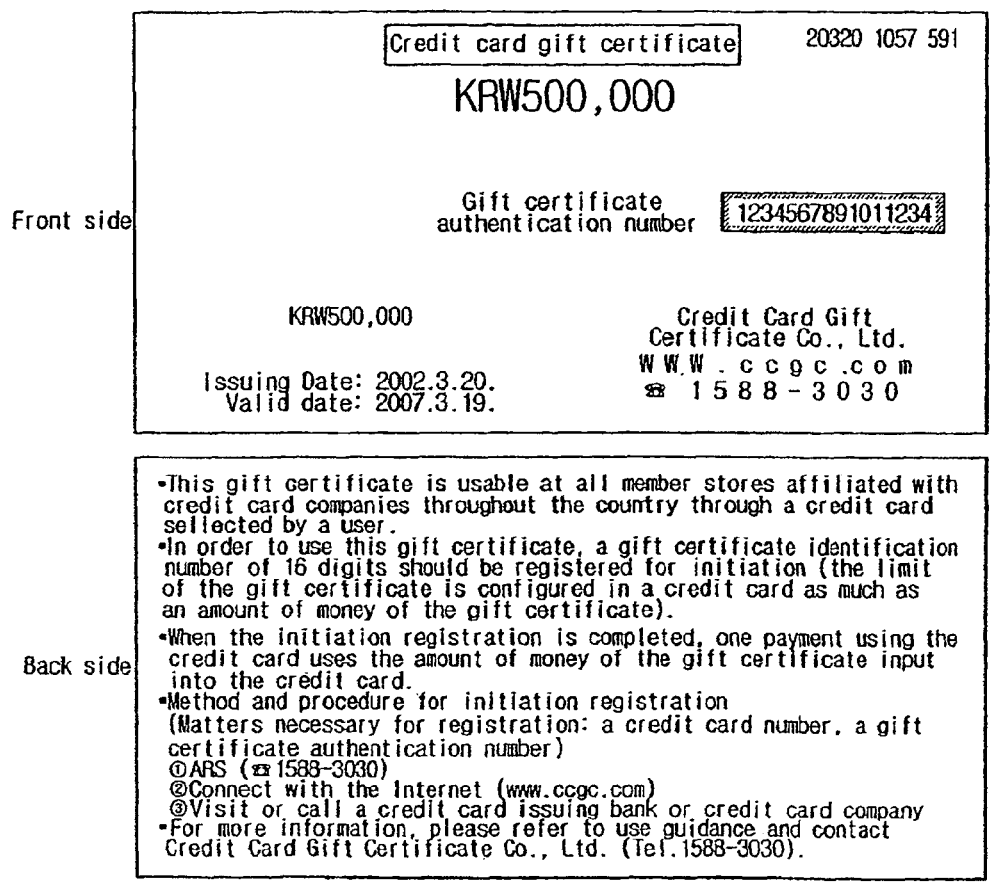
FIG. 1 is a drawing showing an example of the credit card gift certificate according to an embodiment of the present invention.

EXPLANATION OF REFERENCE NUMERALS FOR DESIGNATING MAIN COMPONENTS IN THE DRAWINGS

100 System for operating credit card gift certificate
110 Credit card user's terminal
120 Credit card gift certificate server
130 Credit card company's server
140 Gift certificate issuing information DB
150 Credit card information DB

BEST MODE FOR CARRYING OUT THE INVENTION

Hereinafter, a system and method for operating a credit card gift certificate according to preferred embodiments of the present invention will be described in detail with reference to the accompanying drawings.

Figure 2:
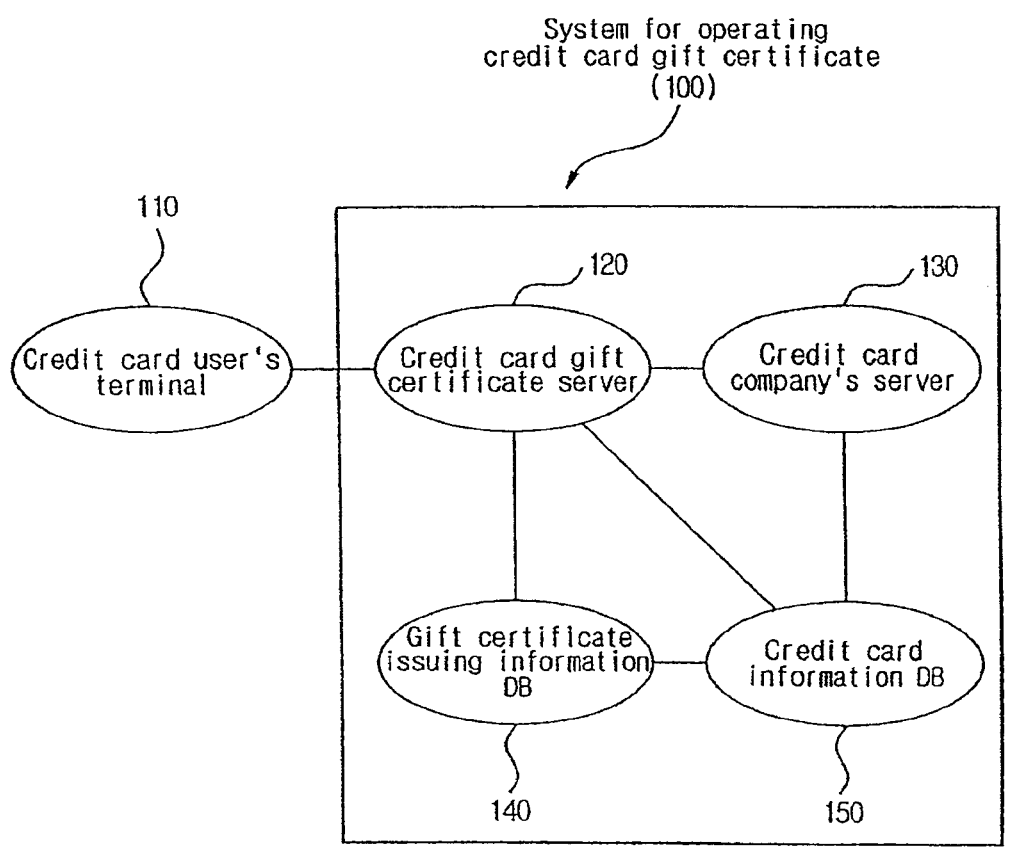
FIG. 2 is a drawing showing an entire configuration of a credit card gift certificate operating system according to an embodiment of the present invention.

FIG. 2 shows an entire configuration of a credit card gift certificate operating system 100 by which a gift certificate can be operated based on credit card transactions according to a preferred embodiment of the present invention.

As shown in FIG. 2, the credit card gift certificate operating system 100 comprises a credit card gift certificate server 120, a credit card company's server 130, a gift certificate issuing information database (DB) 140, and a credit card information DB 150. A user of a credit card gift certificate connects with the credit card gift certificate operating system 100 through a user's terminal 110.

The user's terminal 110 includes a general wired telephone, a cellular phone, a personal computer (PC) and the like. The user of the credit card gift certificate can connect with the credit card gift certificate server 120 through a variety of communication networks such as a public switched telephone network, a mobile communication network, the Internet or the like using the terminal 110.

The credit card gift certificate server 120 may be positioned in each of the credit card companies, or positioned in Credit Card Gift Certificate Co., Ltd. to be connected and operated with a plurality of credit card company's servers 130 through a communication network. The credit card gift certificate server 120 may comprises a host unit including a processor for controlling entire operations of the server system, a terminal unit for a user interface, a communication network connection unit for connection with the communication network, and a data storage unit.

The credit card company's server 130 is a server for managing credit card transactions and performing all general functions that have been performed by a conventional server used for credit card transactions. Namely, the credit card company's server 130 receives a transaction approval request from a member store and determines whether to approve the transactions with reference to credit card information stored in the credit card information DB 150 in response to the transaction approval request. Further, the credit card company's server 130 collects credit card transaction information, which has been received together with the transaction approval request, and stores the collected information in the credit card information DB by each user. In a case where a sales slip is received from the member store, the credit card company's server 130 performs a function of paying a credit card sales amount for the member store according to a general payment procedure.

Figure 3:
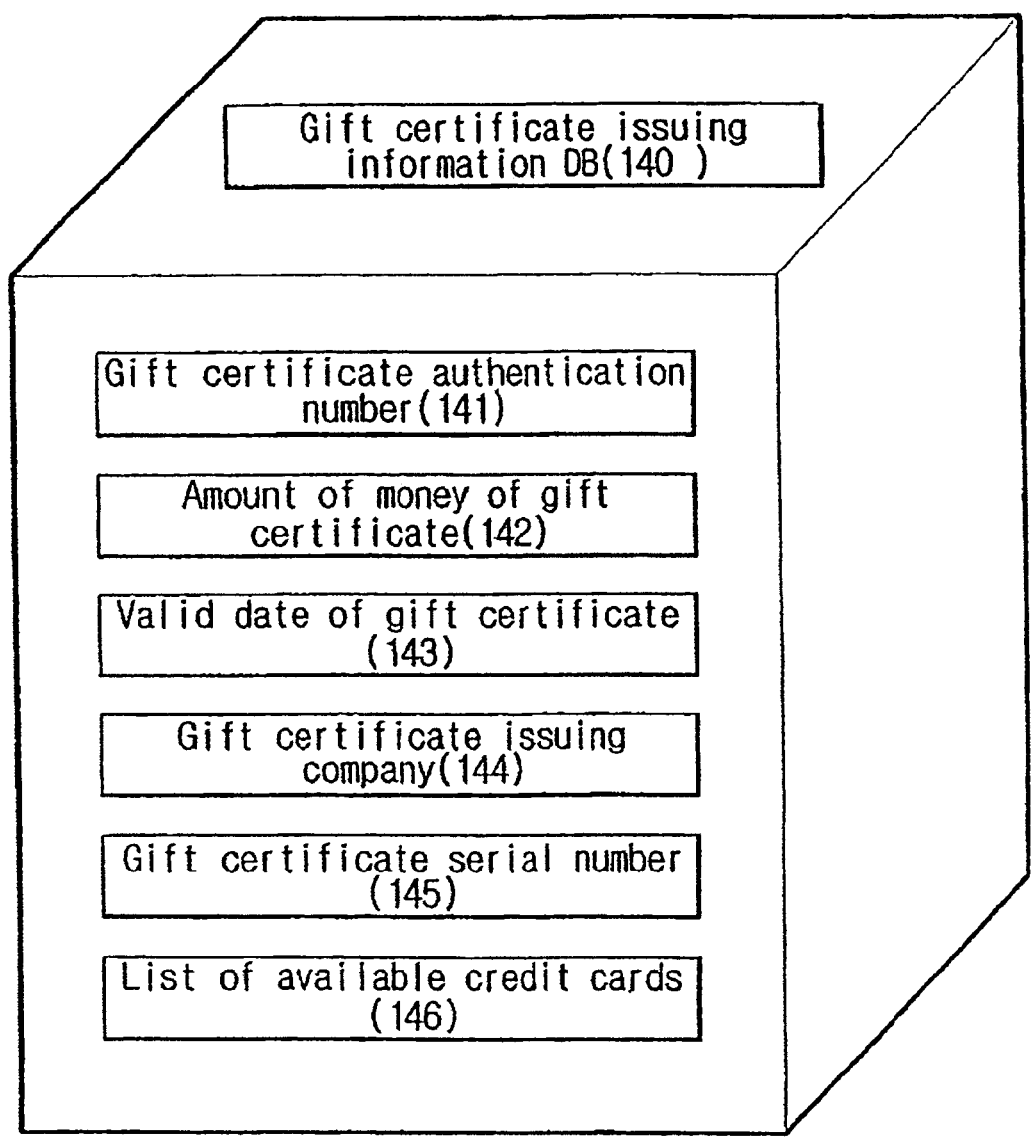
FIG. 3 is a drawing showing a configuration of the gift certificate issuing information DB.

The gift certificate issuing information DB 140 is a DB for storing information on gift certificates issued by Credit Card Gift Certificate Co., Ltd. FIG. 3 exemplarily shows a specific configuration of the gift certificate issuing information DB 140. The gift certificate issuing information may include gift certificate authentication numbers 141, amounts of money of gift certificates 142, valid dates of gift certificates 143, gift certificate issuing companies 144, gift certificate serial numbers 145, a list of available credit cards 146 and the like. The gift certificate issuing information DB 140 is positioned in Credit Card Gift Certificate Co., Ltd. and the credit card gift certificate server 120 can freely gain access to information stored in the gift certificate issuing information DB 140.

Figure 4:
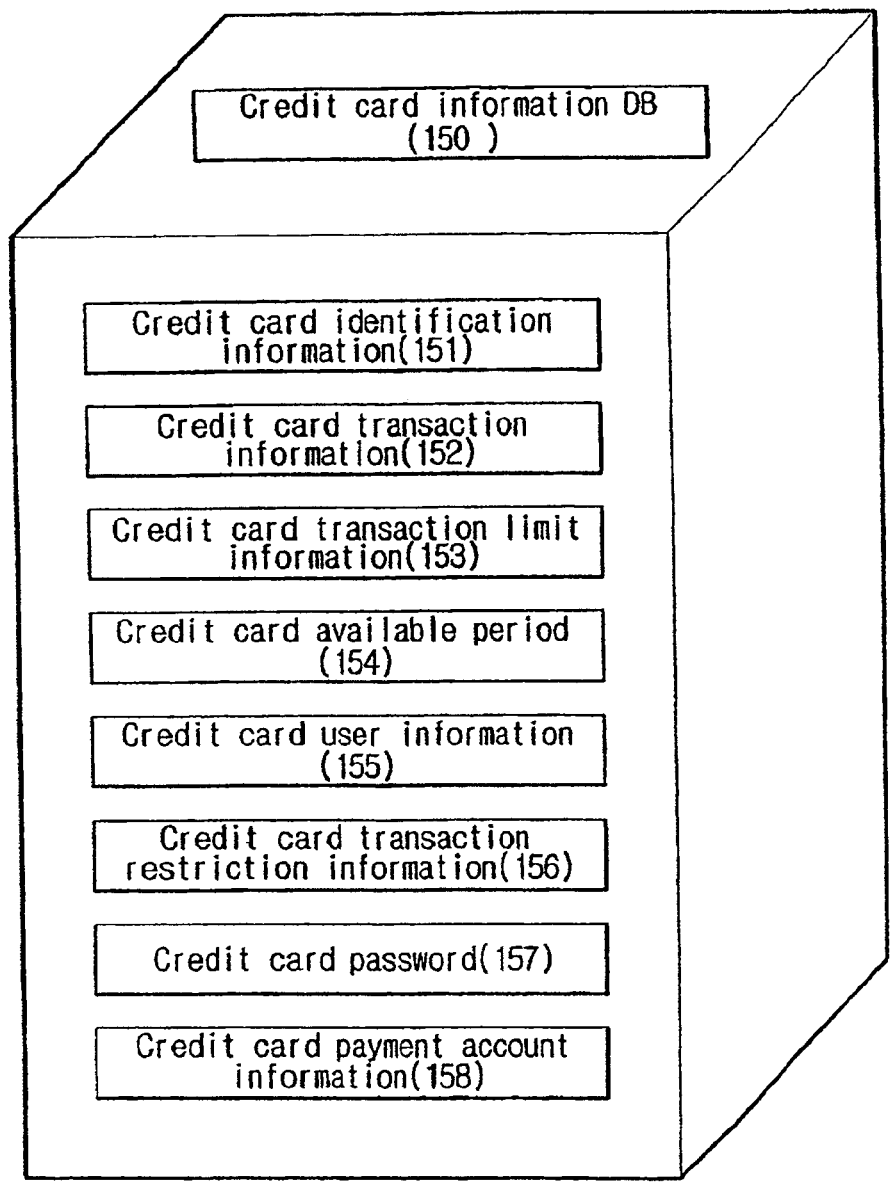
FIG. 4 is a drawing showing a configuration of the credit card information DB.

The credit card information DB 150 is a DB for storing information on credit cards issued by the credit card companies. FIG. 4 exemplarily shows a specific configuration of the credit card information DB 150. The credit card information may include credit card identification numbers 151, credit card transaction information 152, credit card transaction limit information 153, valid dates of credit cards 154, credit card user information 155, credit card transaction restriction information 156, credit card passwords 157, credit card payment account information 158 and the like. The credit card information DB 150 may be operated individually by each credit card company or commonly by a plurality of credit card companies. The credit card gift certificate server 120 and the credit card company's server 130 can freely gain access to information stored in the credit card information DB 140.

FIG. 5 is a flowchart showing a procedure of a method for performing credit card transactions using the credit card gift certificate in the system of FIG. 2. Processes in respective steps performed for the use of the credit card gift certificate will be described hereinafter in detail with reference to FIG. 5.

In step S100, a request for use of a credit card gift certificate is received from a credit card user possessing the credit card gift certificate. In order for the credit card user who has been presented with or has purchased the credit card gift certificate to make credit card transactions using the gift certificate, the request for use of the gift certificate should be indispensably first made. In the step of receiving the request for use of the gift certificate, information on the request for use of the gift certificate is received from the credit card user who possesses the gift certificate. The information on the request for use of the gift certificate may include a gift certificate authentication number and a credit card identification number printed on the surface of the gift certificate. Since Credit Card Gift Certificate Co., Ltd. affiliates with a plurality of credit card companies in connection with the use of the gift certificate, the credit card gift certificate of the present invention can be used for a variety of credit cards issued by the plurality of credit card companies. The list of available credit cards may be printed on the surface of the gift certificate, and a bearer of the gift certificate can select one credit card to be used among a plurality of credit cards owned by himself/herself.

To receive the request for use of the gift certificate, the credit card gift certificate server 120 receives the information on the request from the user's terminal 110 through the communication network. Alternatively, in a case where the credit card user directly visits one of agents operated by Credit Card Gift Certificate Co., Ltd. or the credit card companies or makes the request to the agent by telephone, the gift certificate server 120 can receive the request from an agent's terminal. Further, even in a case where the credit card user purchase goods by a credit card at a member store affiliated with a relevant credit card company, the gift certificate server 120 can receive the request from the agent's terminal when the user presents the credit card gift certificate of the present invention to the member store.

To more strictly determine whether a credit card gift certificate is lawful, the user may be asked to additionally input an amount of money of the gift certificate or a gift certificate password as the information on the request for use thereof in addition to the gift certificate authentication number. The gift certificate server 120 identifies the credit card gift certificate carried by the credit card user based on the information on the request for use of the gift certificate received from the user.

In step S110, the gift certificate server 120 verifies whether the gift certificate is usable in response to the request for use of the gift certificate received in step S100. The step of verifying whether the gift certificate is usable includes the step of determining whether the gift certificate is lawful by using the information received from the credit card user upon receipt of the request. The determination of whether the gift certificate is lawful is to identify a forged gift certificate with a fraud authentication number or a gift certificate falsely requested due to an error of the credit card user. This determination can be achieved in such a manner that the credit card gift certificate server 120 gains access to the gift certificate issuing information DB 140 and compares the gift certificate authentication number 141 stored in the DB 140 with the gift certificate authentication number received from the credit card user. As another embodiment of the present invention, even in a case where the gift certificate issuing information such as the amount of money of the gift certificate in addition to the gift certificate authentication number is received in step S100, such information can be used for determining whether the gift certificate is lawful through comparison thereof with the information stored in the gift certificate issuing information DB 140.

As a further embodiment of the present invention, the step of verifying whether the gift certificate is usable may include the step of determining whether the credit card is usable. Such a step is to prevent use of a gift certificate by a person with bad credit rating or use of a gift certificate based on credit card transactions in which a valid date of a credit card has expired and normal transactions cannot be made. This determination can be achieved in such a manner that the credit card gift certificate server 120 searches the valid dates of credit cards 154 or credit card transaction restriction information 156 stored in the credit card information DB 150 by using the credit card identification number 151 received from the credit card user in step S100. As a still further embodiment regarding the determination of whether a lawful credit card user can utilize a credit card, step S100 may include the step of comparing, by the credit card gift certificate server 120, the credit card identification number 151 and the credit card password 157 received from the credit card user with the information stored in the credit card information DB 150.

If it is determined in step S110 that the gift certificate is usable, the limit of the gift certificate corresponding to the amount of money of the gift certificate is configured in the credit card of the credit card user in step S120.

In most of credit card transactions presently made, the credit card transaction limit consists of a combination of one payment limit, installment limit, cash service limit and the like. A credit card user is restricted in his/her credit card transactions by the above limits. Generally, such limits are determined through appraisal of credit rating of the credit card user by the credit card company based on transaction history of the credit card user.

Due to the configuration of the limit of the gift certificate according to the present invention, a new credit card transaction limit made by adding the limit of the gift certificate to the existing credit card transaction limit of the credit card user is established, and the credit card user can make credit card transactions additionally as much as the added transaction limit corresponding to the amount of money of the gift certificate.

To configure the limit of the gift certificate, the gift certificate server 120 can directly gain access to the credit card information DB 150 and update the credit card transaction limit information 153 with respect to a credit card identification number of the user. As a still further embodiment, the gift certificate server 120 can transmit a request for configuration of the limit of the gift certificate to the credit card company's server 130, which can update the credit card transaction limit information 153 in the credit card information DB 150 in response to the request for configuration of the limit of the gift certificate.

The procedure for additionally configuring, by the bearer of the credit card gift certificate, the limit of the credit card gift certificate corresponding to the amount of money of the gift certificate to his/her own credit card has been described. Now, a procedure for making credit card transactions and payment using the configured limit of the gift certificate by the credit card user will be described in detail.

As described in the disclosure of invention, in the method for operating the credit card gift certificate according to the present invention, the existing credit card owned by the credit card user can be utilized as it is without issuing an additional credit card, and the procedures performed among the credit card user, the member store and the credit card company in credit card transactions made at the member store are almost the same as conventional procedures for credit card transactions. That is, the member store requests the credit card company to approve the transactions using the credit card presented by the credit card user, and the credit card user signs a sales slip after receipt of approval determination from the credit card company. Then, information related to such credit card transactions is stored as the credit card transaction information 152 in the credit card information DB 150. The credit card company's server 130 gains access to the credit card transaction information 152 stored in the credit card information DB 150, prints use particulars of the credit card on a credit card bill based on such information and notifies the credit card user of the credit card bill. Then, the credit card user makes payment for the notified amount on a predetermined payment due date. The member store collects sales slips and requests the credit card company to pay sales amount. The credit card company subtracts a predetermined amount of service fee from the payment amount received from the credit card user and then gives the difference to the member store.

FIGS. 6a and 6b show general examples of a credit card bill notified to a credit card user in conventional credit card transactions. FIG. 6a shows billing particulars of amounts of money paid by the credit card and FIG. 6b shows detailed use particulars of the credit card.

FIGS. 7a and 7b show examples of a credit card bill notified to the credit card user in the credit card transactions in which the limit of the gift certificate is additionally configured to the credit card according to the present invention. The credit card company's server 130 generally gains access to the credit card transaction information 152 stored in the credit card information DB 150 to prepare the credit card bill and additionally gains access to the credit card transaction limit information 153 to determine the configured limit of the gift certificate and to prepare the credit card bill by reflecting the configured limit thereon. That is, in a case where an amount of money paid by the credit card of the user obtained from the credit card information DB exceeds the limit of the gift certificate, the credit card company's server 130 computes an amount of money to be paid by the credit card user by subtracting the limit of the gift certificate from the amount paid by the credit card. Then, the credit card company's server 130 resets the limit of the gift certificate to '0' Korean won(KRW) and stores it in the credit card information DB 150. If an amount of money paid by the credit card is within the limit of the gift certificate, the credit card company's server 130 sets the residual limit of the gift certificate obtained by subtracting a used amount of money from the original limit of the gift certificate as a new limit of the gift certificate, and stores the new limit of the gift certificate in the credit card information DB 150. An amount of money corresponding to the residual limit of the gift certificate can be refunded according to a predetermined procedure and within a predetermined period of time when the user requests refund of the amount. If there is no request for refund, the residual limit of the gift certificate is again set as a new limit of the gift certificate and can be used in future credit card transactions in the next month or later on.

As shown in FIGS. 6a to 7b, both use particulars of a credit card owned by a credit card user are the same. However, since the limit of a gift certificate of 500,000 Korean won is additionally configured in FIGS. 7a and 7b, an amount of money obtained by subtracting 500,000 Korean won from a used amount of money becomes an amount of money that should be actually paid by the credit card user.

As one embodiment of the present invention, in a case where a credit card user makes credit card transactions using a credit card in which the limit of a gift certificate is additionally configured, an amount up to the limit of the gift certificate is first used in payment, and an amount up to one payment limit is then additionally used in payment for a transaction amount exceeding the limit of the gift certificate. According to such an embodiment, the limit of the gift certificate is updated depending on an amount paid by the credit card every approval of credit card transactions. That is, the credit card company's server 130 gains access to the limit of the gift certificate of the credit card transaction limit information 153, updates the changed limit of the gift certificate obtained by subtracting an amount paid by the credit card from the original limit of the gift certificate as a new limit of the gift certificate, and stores again the new limit of the gift certificate in the credit card transaction limit information 153. If an amount paid by the credit card exceeds the current limit of the gift certificate, the credit card company's server 130 updates the limit of the gift certificate of the credit card transaction limit information 153 as '0' Korean won, and causes one payment limit to be used in paying the difference. Further, the credit card company's server 130 determines whether credit card transactions are performed by using the limit of the gift certificate or one payment limit, and stores the determination results in the credit card transaction information 152 so that the information may be used for preparing a credit card bill.

FIG. 8 shows a credit card sales slip in conventional credit card transactions. As shown in FIG. 8, 'sales classification' indicated on the credit card sales slip shows whether the credit card transactions are 'one payment' or 'installment' transactions.

FIG. 9 shows a credit card sales slip in the method for operating the credit card gift certificate according to the present invention. As shown in FIG. 9, the credit card company's server 130 marks 'gift certificate' on the sales classification section of the credit card sales slip in a case where credit card transactions are approved within the limit of the gift certificate. That is, upon approval of credit card transactions, the credit card company's server 130 gains access to the limit of the gift certificate in the credit card transaction limit information 153, approves the credit card transactions by causing the limit of the gift certificate or one payment to be used in consideration of the limit of the gift certificate, and then marks the payment results on the 'sales classification' section. Moreover, in the method for operating the credit card gift certificate shown in FIG. 9, a residual limit of the gift certificate can be disclosed on the credit card sales slip. As illustrated in FIG. 9, the credit card company's server 130 marks the limit of the gift certificate updated upon approval of credit card transactions on the credit card sales slip, as the residual limit of the gift certificate.

As described above, the credit card user can recognize from the credit card sales slip in the credit card transactions that the approval of the credit card transactions is made within the limit of the credit card gift certificate and can also immediately find the current residual limit of the gift certificate. As another embodiment, the credit card user may inquire the credit card company or Credit Card Gift Certificate Co., Ltd. of particulars of credit card transactions and the residual limit of the gift certificate by making a phone call thereto or through a communication network such as Internet.

The credit card transaction method using the aforementioned credit card gift certificate can also be applied to a case where a credit card is a type of "account transaction card." The "account transaction card" means a credit card of which a transaction limit is "0" Korean won. In transactions using the account transaction card, contrary to general credit card transactions, transaction approval is made only after confirming that the balance in a relevant bank account associated with the credit card is above an amount to be paid by the credit card when a member store requests the transaction approval. The next procedures are the same as general credit cards. When the credit card gift certificate of the present invention is applied to the account transaction card, the credit card gift certificate server 120 or the credit card company's server 130 newly generates the credit card transaction limit of the account transaction card corresponding to an amount of money of a gift certificate so that the newly generated credit card transaction limit can be used in transactions using the account transaction card.

Figure 10:
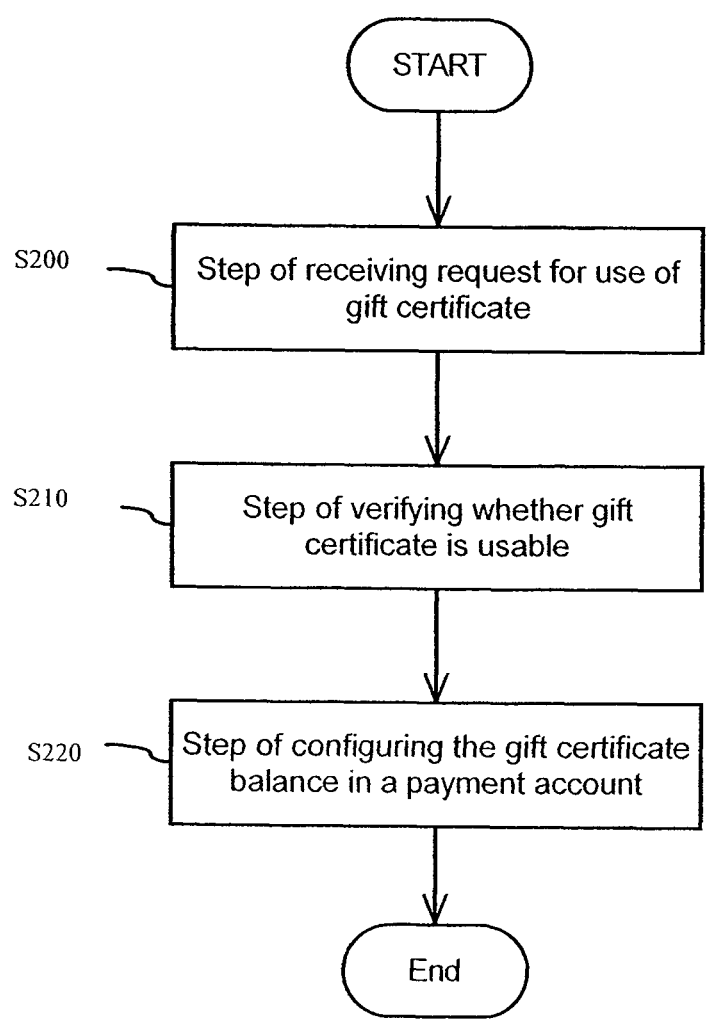
FIG. 10 is a flowchart illustrating an embodiment in which an amount of money of a gift certificate is configured as the gift certificate balance in a payment account for a credit card so that it can be used in credit card transaction.

FIG. 10 is a flowchart illustrating a further embodiment in which an amount of money of a gift certificate is configured as the gift certificate balance in a payment account for a credit card so that it can be used in credit card transactions. That is, instead of configuring the amount of money of the gift certificate as the limit of the gift certificate in the credit card as shown in FIG. 5, the amount of money of the gift certificate is configured as the virtual balance of "gift certificate balance" in the payment account for the credit card of the credit card user. An amount obtained by subtracting the balance from an amount paid by the credit card can be calculated as a payment amount to be paid by the credit card user upon preparation of a credit card bill, and the user is then notified of the calculated amount.

The processes in steps S100 and S110 in the embodiment shown in FIG. 5 may be directly applied to step S200 and 210. In step S220, the gift certificate balance corresponding to the amount of money of the gift certificate is configured in the payment account for the credit card. To configure the gift certificate balance, the gift certificate server 120 may configure the gift certificate balance in the payment account by directly gaining access to the credit card information DB 150 and adding the gift certificate balance to the credit card account information 158 corresponding to the credit card identification number of the credit card user. Alternatively, the gift certificate server 120 may request the credit card company's server 130 to configure the gift certificate balance, and the credit card company's server 130 may update the credit card account information 158 in the credit card information DB 150 in response to the request for configuration of the gift certificate balance. In a case where the gift certificate balance is configured in the credit card as much as the amount of money of the gift certificate according to the embodiment shown in FIG. 10, the method further comprises the step of determining an amount obtained by subtracting the balance from an amount paid by the credit card, as a payment amount to be paid by the user when notifying the user of a credit card bill. That is, the credit card company's server 130 generally gains access to the credit card transaction information 152 stored in the credit card information DB 150 to prepare the credit card bill and additionally gains access to the credit card account information 158 to determine how much the configured gift certificate balance is and to prepare the credit card bill by reflecting the configured gift certificate balance thereon.

The embodiment in which the gift certificate balance is additionally generated in the payment account for the credit card instead of configuring the limit of the gift certificate can be applied to the case where the credit card is the account transaction card. That is, in transactions using the account transaction card, transaction approval is made after an amount paid by the credit card is compared with the balance of the payment account to which the gift certificate balance is added.

Although the embodiment described in connection with FIG. 10 has exemplified the configuration of the gift certificate balance in the payment account for the credit card or account transaction card, the gift certificate balance may also be identically configured in other virtual accounts designated by the credit card user as well as the payment account of the credit card user. Further, this embodiment may be directly applied to the processes of paying an amount paid by the credit card and preparing a credit card bill.

Although the system and method for operating the gift certificate using the credit card has been described, it will be apparent to those skilled in the art that various changes and modifications can be made thereto based on the preferred embodiments of the present invention.

According to the present invention, it can be understood from the embodiments that the operation of the credit card gift certificate can also be applied to bearer card transactions. That is, a bearer of the credit card gift certificate of the present invention can configure an amount corresponding to an amount of money of the gift certificate as the limit of the gift certificate in his/her own bearer card and then make bearer card transactions within the configured limit. Even after an amount corresponding to the limit of the gift certificate is completely used, the limit of a new gift certificate is additionally configured in the bearer card so that the bearer card can be recharged repeatedly and used for card transactions.

In addition, embodiments of the present invention further relate to computer readable media that include program instructions for performing various computer-implemented operations. The media may also include, alone or in combination with the program instructions, data files, data structures, tables, and the like. The media and program instructions may be those specially designed and constructed for the purposes of the present invention, or they may be of the kind well known and available to those having skill in the computer software arts. Examples of computer-readable media include magnetic media such as hard disks, floppy disks, and magnetic tape; optical media such as CD-ROM disks; magneto-optical media such as floptical disks; and hardware devices that are specially configured to store and perform program instructions, such as read-only memory devices (ROM) and random access memory (RAM). The media may also be a transmission medium such as optical or metallic lines, wave guides, etc. including a carrier wave transmitting signals specifying the program instructions, data structures, etc. Examples of program instructions include both machine code, such as produced by a compiler, and files containing higher level code that may be executed by the computer using an interpreter.

Figure 11:
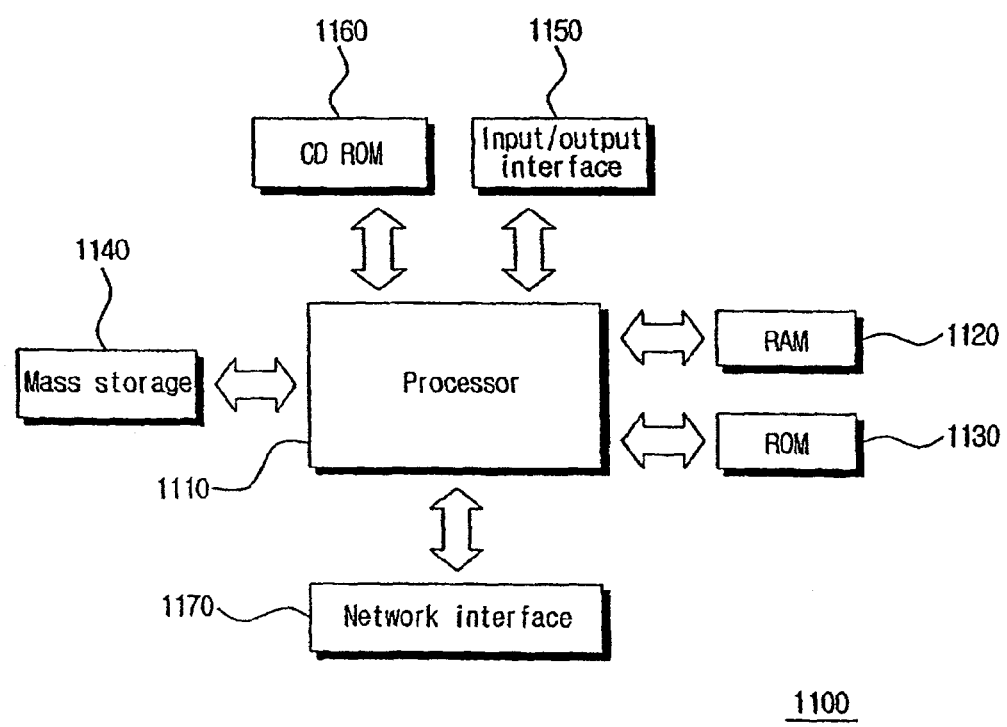
FIG. 11 is a block diagram showing an inner configuration of a typical computer system capable of being used in the method for operating the credit card gift certificate according to the present invention.

FIG. 11 is a block diagram showing an inner configuration of a typical computer system capable of being used the method for operating the credit card gift certificate according to the present invention.

The computer system 1100 includes any number of processors 1110 (also referred to as central processing units, or CPUs) that are coupled to storage devices including primary storage 1120 (typically a random access memory, or "RAM"), primary storage 1130 (typically a read only memory, or "ROM"). As is well known in the art, primary storage 1120 acts to transfer data and instructions uni-directionally to the CPU and primary storage 1120 is used typically to transfer data and instructions in a bi-directional manner. Both of these primary storage devices may include any suitable type of the computer-readable media described above. A mass storage device 1140 is also coupled bi-directionally to CPU 1110 and provides additional data storage capacity and may include any of the computer-readable media described above. The mass storage device 1140 may be used to store programs, data and the like and is typically a secondary storage medium such as a hard disk that is slower than primary storage. A specific mass storage device such as a CD-ROM 1160 may also pass data uni-directionally to the CPU.

Processor 1110 is also coupled to an interface 1150 that includes one or more input/output devices such as such as video monitors, track balls, mice, keyboards, microphones, touch-sensitive displays, transducer card readers, magnetic or paper tape readers, tablets, styluses, voice or handwriting recognizers, or other well-known input devices such as, of course, other computers. Finally, processor 1110 optionally may be coupled to a computer or telecommunications network using a network connection as shown generally at 1170. With such a network connection, it is contemplated that the CPU might receive information from the network, or might output information to the network in the course of performing the above-described method steps. The above-described devices and materials will be familiar to those of skill in the computer hardware and software arts. The hardware elements described above may be configured (usually temporarily) to act as one or more software modules for performing the operations of this invention.

INDUSTRIAL APPLICABILITY

According to the method for operating the credit card gift certificate of the present invention described above, a user of a gift certificate can arbitrarily select one among credit cards and thus use the gift certificate at any one of member stores affiliated with a plurality of credit card companies. Therefore, the gift certificate can be used in a state where a distribution range of the gift certificate is expanded and limitations on purchasable items are remarkably reduced.

Further, according to the method for operating the credit card gift certificate of the present invention, the existing credit card can be used as it is without issuing an additional credit card. Thus, the problem of rejection of use of the gift certificate by some member stores is solved, and time and costs required for issuing an additional new credit card can be reduced.

According to the method for operating the credit card gift certificate of the present invention, since the gift certificate is used based on credit card transactions, there is an advantage in that use particulars of the gift certificate can be easily confirmed through a credit card bill or by inquiring a credit card company of use particulars thereof. Due to such an advantage, the credit card gift certificate of the present invention can be used as a card for pocket money of his/her child. That is, a credit card of which transaction limit is "0" Korean won is issued in the name of one's child who is a person under age and the limit of the gift certificate of the present invention is configured as pocket money in the credit card of the child. Then, there is another advantage in that parents can always check pocket money expenditure particulars of their child and safe credit card transactions can be extended to persons under age. According to the method for operating the credit card gift certificate of the present invention based on credit card transactions, even when the credit card is lost, the residual limit of the gift certificate can be configured again in a newly issued credit card. Furthermore, there is an advantage in that damage compensation can be made for an amount illegally paid by the third party during a period of loss of the credit card. Additionally, it is possible to provide a variety of additional services according to credit card transactions, e.g., accumulation of points corresponding to an amount paid by the credit card, a credit card lottery service, etc.

Further, according to the method for operating the credit card gift certificate of the present invention, there is an advantage in that a transaction amount of a credit card user is increased as much as the limit of the gift certificate.

Furthermore, according to the method for operating the credit card gift certificate of the present invention, there is an advantage in that a payment means is simplified even when purchase exceeding the limit of the gift certificate is made.

Moreover, according to the method for operating the credit card gift certificate of the present invention, there is an advantage in that a credit card user can easily recognize the residual limit of the gift certificate limit through a credit card sales slip.

The invention claimed is:

1. A method of processing a gift certification within a credit card account, the method comprising:
   Receiving, by a computer system associated with a financial institution, a request for registering a gift certificate in a pre-existing credit card account having a credit limit, wherein at least one credit card is associated with the credit cards account and is usable in transactions with a plurality of honoring merchants that are to honor the at least one credit card, wherein the gift certificate has a monetary value;
   Subsequent to receiving the request, establishing, by the computer system, a gift certificate use limit in an amount of the monetary value within the credit card account;

Receiving a plurality of requests for approving a plurality of transaction with a subset of the plurality of honoring merchants using the at least one credit card;

Approving each of the plurality of transactions based on a sum of the credit limit and the gift certificate use limit rather than solely based on the credit limit, the plurality of transactions totaling a total transaction amount; and Subsequent to approving the plurality of transactions, computing, by the computer system, a total charge amount to be charged to an owner of the credit card account for the plurality of transactions, wherein the total charge amount is computed as smaller than the total transaction amount by applying at least some of the gift certificate use limit.

2. The method of claim 1, wherein computing the total charge amount comprises deducting up to the monetary value of the gift certificate first.

3. The method of claim 1, wherein the total charge amount for the plurality of transactions is the total transaction amount less the monetary value when the total transaction amount is greater than the monetary value of the gift certificate.

4. The method of claim 3, further comprising:
subsequent to computing the total charge amount, resetting, by the computer system, the gift certificate use limit to zero within the credit card account.

5. The method of claim 1, wherein the total charge amount for the plurality of transactions is zero when the total transaction amount is smaller than the monetary value.

6. The method of claim 5, further comprising:
subsequent to computing the total charge amount, updating the gift certificate use limit to a residual amount that is the monetary value less the total transaction amount.

7. The method of claim 6, further comprising:
receiving, by the computer system, a request for funding of the residual amount; and
funding the residual amount to the owner of the credit card account.

8. The method of claim 1, further computing:
generating, by the computer system, a credit card account statement, which charges to the owner the total charge amount for the plurality of transactions and informs the owner that the total charge amount is smaller than the total transaction amount based on use of the monetary value from the gift certificate.

9. The method of claim 1, wherein the credit card account has a predetermined credit limit and wherein transactions that result in charges exceeding the predetermined credit limit are approved by the computer system up to an amount that is less than or equal to the monetary value of the gift certificate.

10. The method of claim 9, wherein the predetermined credit limit is equal to or higher than zero.

11. The method of claim 1, wherein the plurality of transactions comprises a first transaction in a first amount and wherein the method further comprises:
sending, by the computer system, to a point of sale of the first transaction, information to be indicated on a first receipt of the first transaction that the first amount is covered by the gift certificate use limit.

12. The method of claim 1, wherein the request comprises information identifying the gift certificate and wherein the method further comprises verifying that the gift certificate is valid.

13. The method of claim 12, wherein verifying comprises communicating with a gift certificate database separate from the computer system.

14. The method of claim 1, further comprising:
subsequent to using at least part of the gift certificate use limit, by the computer system, increasing the gift certificate use limit upon request from the owner of the credit card account.

15. The method of claim 1, wherein the computed total charge amount is the total transaction amount less the at least some of the gift certificate use limit.

* * * * *